Patented Nov. 1, 1938

2,134,909

UNITED STATES PATENT OFFICE 2,134,909

PROCESS FOR REGENERATING WASTE SULPHURIC ACID BY OXIDIZING IMPURITIES

Jan Cornelis de Nooij, Ghent, Belgium, Dirk Jan Gerritsen, Arnhem, Netherlands, and Albert A. Jucker, Manchester, England No Drawing. Application March 18, 1937, Serial No. 131,660. In the Netherlands January 14, 1936

1 Claim. (Cl. 23—172)

Our invention relates to processes for regenerating waste sulphuric acid by heating or concentrating and adding oxidizing means such as nitric acid.

The object of our invention is to recover sulphuric acid in an economical way and especially to recover sulphuric acid by using a very small proportion of the oxidizing means.

Further objects of our invention will appear from the following.

The regeneration of waste sulphuric acid is of much importance e. g. in the parchment and artificial silk industries.

In the artificial silk industry when spinning solutions of cellulose in sulphuric acid it is of importance to recover the sulphuric acid in an economical way. This recovery is a very important point inasmuch as the sulphuric acid is present in the spinning solution in a rather concentrated form (namely always above 50%). The diluted sulphuric acid of the spinning bath in this case also contains impurities, such as hemi-cellulose, which would accumulate in some form in the sulphuric acid if it were not removed.

Various methods have been proposed for removing organic products from sulphuric acid. For instance according to United States Patent 1,457,030 and British Specification 361,509, the sulphuric acid is concentrated until the carbon is brought into the sol form, whereupon the acid is diluted and the sol flocculates. After filtration or the like pure but diluted sulphuric acid is obtained which then must be concentrated again.

A further method consists in oxidizing the organic substances by using oxiding means. For example, according to U. S. Patent 1,836,849 and British Specification 441,452 the sulphuric acid is brought to such a temperature and/or evaporated to such a degree that a complete carbonization takes place and that even carbon is formed, after which—in order to oxidize the carbon—ammonium nitrate and/or nitric acid is added. The same is done according to German Patent 551,165, in which, however, pyrolusite is used, after the carbon has been formed.

According to U. S. Patent 2,069,472 and to British Specification 387,569 the nitric acid is added to the polluted sulphuric acid before evaporation is commenced, or during the concentration; however, before the carbon sol has been formed.

According to the process of our invention nitric acid is also preferably employed, as this substance does not give rise to the formation of a reaction product which is difficult to remove. Other oxidizing means may be used, however, if desired.

In the known processes such as those according to U. S. Patent 1,836,849 and British Specification 441,452 and German Patent 551,165, a very high concentration of the nitric acid is required in order to oxidize the carbon sufficiently quickly, which fact could be expected. After the reaction is completed it is further necessary in some cases to remove the excess of nitric acid from the sulphuric acid and consequently this method gives rise to economic difficulties.

Immediate oxidizing of the organic products by nitric acid before carbonizing sets in, for instance according to British Specification 387,569, also requires a fairly high proportion of nitric acid, as will be gathered from a calculation based on the equation:

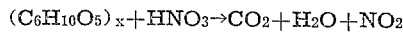

$$(C_6H_{10}O_5)_x + HNO_3 \rightarrow CO_2 + H_2O + NO_2$$

As nitric acid is a more powerful oxidizing means than sulphuric acid, only the nitric acid is consumed by this reaction.

The first mentioned method, namely oxidizing after the carbon has already been formed, has therefore the advantage that at the carbonization stage, the oxidizing has already been accomplished for the most part by the sulphuric acid and only needs completion by the nitric acid. However, this method possesses the considerable disadvantage that the oxidation is a reaction which attacks the surface of the colloidal products of carbonization. This reaction is much slower than the direct oxidation of the hemi-cellulose so that a higher nitric acid concentration is required.

The second method, namely the addition of the nitric acid before concentration, has the advantage that the waste products can be easily oxidized, but the considerable disadvantage that nitric acid—a much more expensive substance—is employed as the oxidizing agent.

Our present invention, however, contemplates an intermediate method by which both disadvantages are eliminated and both advantages are maintained. Our process is characterized in that as soon as the formation of the sol begins which is perceptible due to the appearance of a brown coloring, a small proportion of nitric acid is added, upon which this brown color disappears immediately. The addition is continued until the sol remains colorless. By this method the carbonized products are "titrated" immediately as they are formed.

The carbon products in this condition are so quickly oxidized that:

1. The smallest theoretically possible proportion of nitric acid is sufficient,
2. The carbon is oxidized before the other substances are.

This "titration" method therefore possesses the advantage that the smallest possible proportion of nitric acid is used in the reaction itself and an excess which would have to be removed afterwards is avoided. Furthermore, this method possesses the considerable advantage that the carbon products themselves serve as the indicator so that no analysis is necessary for ascertaining the necessary proportion of nitric acid to be added.

As an example of our method the following is given in which only one twelfth of the theoretical proportion necessary for the reaction: hemi-cellulose+$HNO_3$, appears to be necessary.

*Example*

1000 litres of sulphuric acid of 15.1% containing 0.0840 g. of hemi-cellulose per 100 ccs. only require 750 ccs. of $HNO_3$ of 68%.

In general it has been found that when concentrating in the open air carbonizing sets in as soon as the sulphuric acid concentration is about 40% by weight. When concentrating in vacuo it is possible in general to concentrate up to about 60% by weight of sulphuric acid content without carbonizing taking place. This is evident because the concentration under reduced pressure takes place at a considerably lower temperature. The concentration at which carbonizing begins is especially dependent on the temperature. When a temperature of about 75° C. is reached in evaporating, the carbonizing generally occurs rapidly, even in vacuo, and thereafter the results in the open air and in vacuo are the same.

We claim:—

The process of regenerating sulphuric acid containing cellulose products which comprises heating the acid until the appearance of a brown coloration shows the formation of a carbon sol, adding a small portion of nitric acid and again heating until a brown coloring appears and repeating the above steps until upon addition of nitric acid and heating no further coloring appears.

J. C. DE NOOIJ.
DIRK J. GERRITSEN.
ALBERT A. JUCKER.